United States Patent
Harrington

[15] 3,652,888
[45] Mar. 28, 1972

[54] TWO POLE, 45 SLOT, THREE CIRCUIT DYNAMOELECTRIC MACHINE WINDING PATTERN

[72] Inventor: Dean B. Harrington, Ballston Lake, N.Y.

[73] Assignee: General Electric Company

[22] Filed: Mar. 18, 1971

[21] Appl. No.: 125,479

[52] U.S. Cl. ............................................. 310/198, 310/202
[51] Int. Cl. ....................................................... H02k 3/00
[58] Field of Search ........................................ 310/198–207

[56] References Cited

UNITED STATES PATENTS

| | | |
|---|---|---|
| 3,476,964 | 11/1969 | Willyoung...........................310/202 X |
| 2,778,963 | 1/1957 | Habermann, Jr. .....................310/202 |
| 3,152,273 | 10/1964 | Harrington..........................310/202 X |
| 3,255,368 | 6/1966 | Rauhut .................................310/205 |

Primary Examiner—D. F. Duggan
Attorney—William C. Crutcher, James W. Mitcheil, Frank L. Neuhauser, Oscar B. Waddell and Joseph B. Forman

[57] ABSTRACT

Winding patterns for two pole, three phase, dynamoelectric machines having 45 slots and three parallel connected circuits per phase, and arranged to reduce voltage and phase unbalance between circuits.

3 Claims, 4 Drawing Figures

2 POLE
45 SLOT
3 CIRCUIT
A PHASE ONLY

PHASE A

INVENTOR:
DEAN B. HARRINGTON,
BY W. C. Crutcher
HIS ATTORNEY.

2 POLE  
45 SLOT  
3 CIRCUIT  
A PHASE ONLY

INVENTOR:
DEAN B. HARRINGTON,
BY W. C. Crutcher
HIS ATTORNEY.

3,652,888

TWO POLE, 45 SLOT, THREE CIRCUIT DYNAMOELECTRIC MACHINE WINDING PATTERN

BACKGROUND OF THE INVENTION

This invention relates generally to polyphase, multicircuit dynamoelectric machine winding patterns, and more particularly to winding patterns for a two pole, three phase, 45 slot dynamoelectric machine with three parallel connected circuits per phase.

A conventional turbine-driven polyphase generator of large size comprises a stationary armature element and a cooperating rotatable field element, and may be operative to generate three-phase electric power at a frequency of 60 hertz, whereby the field element, if of two-pole construction, is rotated at 3,600 r.p.m. In the generator, the armature element or core is formed of magnetizable material and is normally provided with an elongated cylindrical opening therethrough that is bounded by a number of angularly spaced-apart winding slots, in which a composite three-phase armature winding is carried, the armature winding including three individual phases that are frequently connected in Y or star relation to supply the load. The field element is also formed of magnetizable material and is normally of the elongated cylindrical-rotor type and carries a field winding, the field element being arranged in the armature opening and being operative upon rotation to induce phase voltages in the respective phases of the armature winding.

Ordinarily, each phase of the armature winding includes a number of phase belts each provided with a plurality of series connected coils each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and from the armature element.

In directly cooled machines, each of the winding slots also accommodates facility for cooling the two contained coil sides, which cooling facility ordinarily includes a duct arrangement through which a current of air or other gas, or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slot thereof, presents design problems of ever-increasing complexity.

In order to obtain a maximum power output from a polyphase generator structure of given physical dimensions, it has been proposed in U.S. Pat. No. 2,778,963, granted on Jan. 22, 1957 to Rudolph Habermann, Jr., that each phase of the armature winding be provided with three parallel circuits arranged in a pair of series connected sections respectively disposed in a pair of oppositely poled phase belts, wherein the coil sides of the three parallel circuits are arranged in a predetermined sequence in the slots in the phase belts in order to minimize voltage and phase unbalance among the three individual circuits of the phase mentioned.

Improvements over the aforesaid Haberman patent are disclosed in U.S. Pat. No. 3,152,273 granted on Oct. 6, 1964 to Dean B. Harrington which discloses winding patterns suitable for dynamoelectric machines with three parallel connected circuits per phase, wherein the coil sides are arranged in a predetermined and improved sequence in the slots in two phase belts thereof, so as to obtain minimum voltage and phase unbalance among the individual ones of the three parallel circuits in the phase, while preserving simplicity of the mechanical construction and arrangement of the coils comprising the three circuits of the phase. Specifically disclosed therein is a winding pattern for a 72 slot generator with very low values of voltage unbalance and total absence of phase unbalance between circuits, giving very low values of "relative heating" which is one measure of acceptability of a multicircuit winding.

The aforesaid Haberman U.S. Pat. No. 2,778,963 and Harrington U.S. Pat. No. 3,152,273 are incorporated by reference herein.

In some generator designs, certain economies and technical benefits are achieved by reducing the number of armature slots, particularly in directly-cooled generators of very large ratings. If it is desired to reduce armature bar forces by employing multicircuit windings, it is generally more difficult to find suitable patterns which reduce the unbalance between circuits as the number of circuits increase and the number of slots decrease. To illustrate, the number of slots in a three phase winding with three parallel connected circuits per phase must be divisible by nine. For example, reducing the number of slots from the 72 slot pattern shown in the aforesaid Harrington patent gives the possibility of 63, 54, 45... etc. slots. Heretofore, efforts to reduce the number of slots to 45 without creating substantial circulating currents among the three circuits have been unsuccessful.

Accordingly, one object of the present invention is to provide improved winding patterns for a 45 slot, three phase, two pole, three circuit dynamoelectric machine with acceptably small circulating currents between circuits.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a diagrammatic illustration of a portion of a dynamoelectric machine provided with an armature winding, only one phase of the three phase armature winding being illustrated, FIG. 2 is a combined schematic diagram of the phase belt arrangement in the armature winding and a vectorial diagram of the phase voltage components induced in the different coils of the armature winding, FIGS. 3 and 4 are similar to FIGS. 1 and 2 respectively, but illustrating a modified winding pattern according to the present invention.

SUMMARY OF THE INVENTION

Briefly stated, the invention is practiced by providing a polyphase winding with three parallel connected circuits per phase, wherein the phase belt having the greater number of coils contains four coils from the first circuit and two coils from each of the remaining two circuits, the coil sides being arranged in a manner to minimize unbalance.

DESCRIPTION OF THE PREFERRED EMBODIMENT

Figure 1:
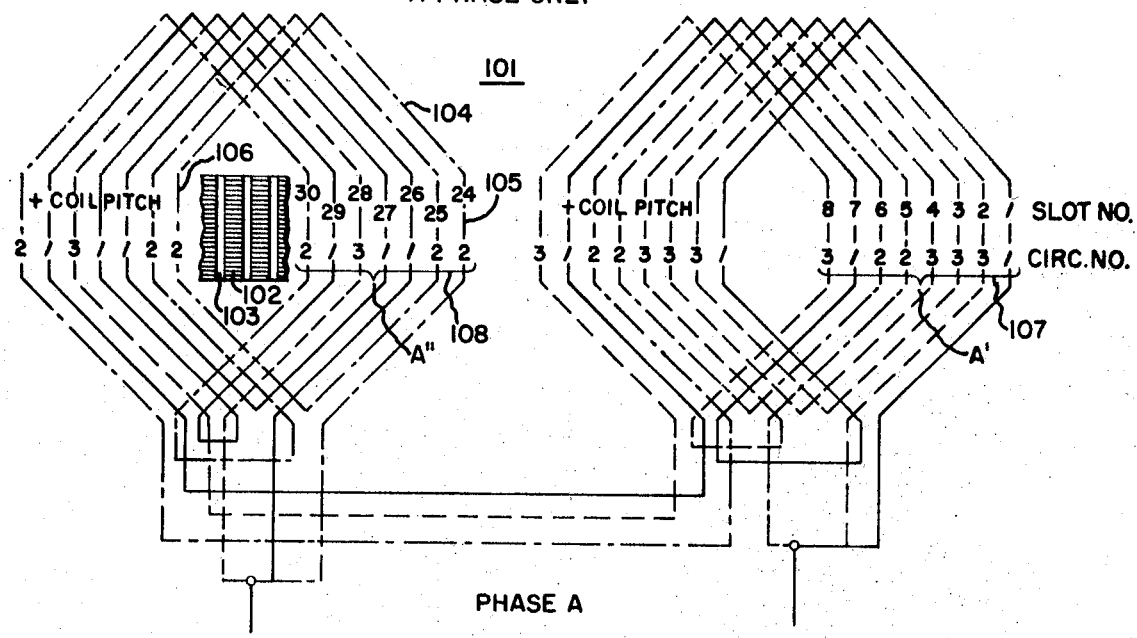

Referring now to FIG. 1 of the drawing, a winding 101 is diagrammatically illustrated for placement in the stationary armature core 102 of a dynamoelectric machine. The winding is a two layer lap winding wherein two coil sides are adapted to be contained within a slot such as 103 in the core. The winding is made up of turns or coils 104, each having a top coil side 105 in the top of a slot and a bottom coil side 106 lying in the bottom of a slot which is displaced from the top coil side by a fraction of the total pole pitch in the case of a corded winding. The pitch of the coils may be expressed as a fraction where the numerator is the number of slots between top and bottom coil sides of a turn while the denominator is the number of slots between poles.

FIG. 1 shows only phase A of the winding 101, it being understood by those skilled in the art that the other two phases B and C are identical except that they are displaced 120 electrical degrees on either side of phase A. The location of the top coil sides is indicated by designation of the slot number in which each coil side is placed. In FIG. 1, the A phase of the winding comprises a positive phase belt A' having eight coils with the top coil sides 107 located in slot numbers 1–8 and a negative phase A'' with seven coils having the top coil sides 108 located in slots 24–30, the slot numbers of each of the respective coil sides being shown in the top row of numbers.

The bottom coil sides are located in circumferentially displaced slots from the top coil sides by a number of slots determined by the selected coil pitch which may vary according to the generator design, but is normally less than 180 electrical degrees in the case of a corded pitch winding. As indicated previously, phase B would be identical, but would commence in slot number 16 rather than slot number 1, and phase C would commence in slot number 31.

It is important to note in the present invention, that one phase belt A' has a greater number of coils, while the other phase belt A'' has a lesser number of coils.

Each phase in the present winding is further subdivided into three parallel connected circuits designated arbitrarily as circuit numbers 1, 2 and 3, the circuit number being indicated on the respective coil sides in the second row of numbers.

In accordance with the present invention, the arrangement of coil sides among the two phase belts is selected so that a low degree of unbalance as to voltage phase and magnitude exists between voltages generated in the first, second and third parallel connected circuits. The circuit sequence moving from right to left on FIG. 1 in the phase belt A' having the greater number of coils is 1, 3, 3, 3, 2, 2, 1, 3 and in the phase belt A'' the sequence is 2, 2, 1, 1, 3, 1, 2.

Figure 2:
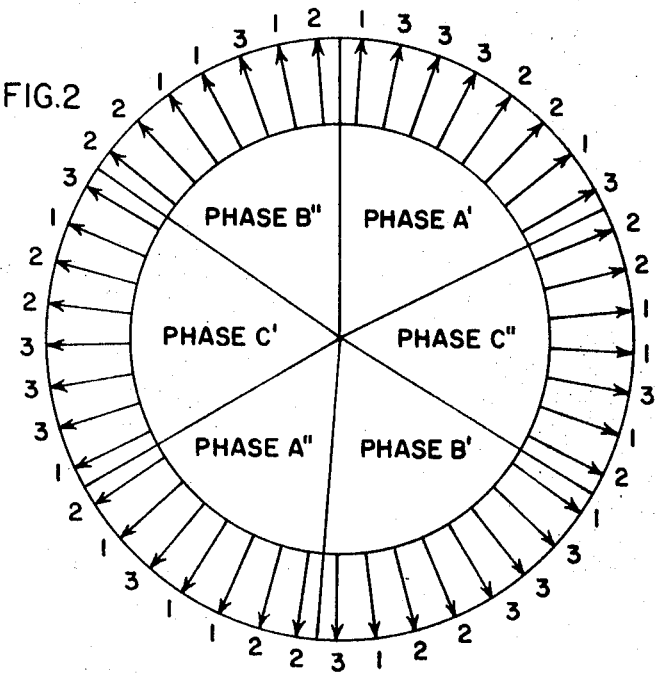

FIG. 2 is a vector diagram for all three phases of the winding, illustrating the circuit sequences in the positive and negative phase belts of each phase. The coil sequences in phases B and C are identical to those in phase A. Note that greater and lesser phase belts alternate around one coil, i.e., A'— eight turns, C''— seven turns, B'— eight turns, A''— seven turns, C'— eight turns and B''— seven turns.

Figure 3:
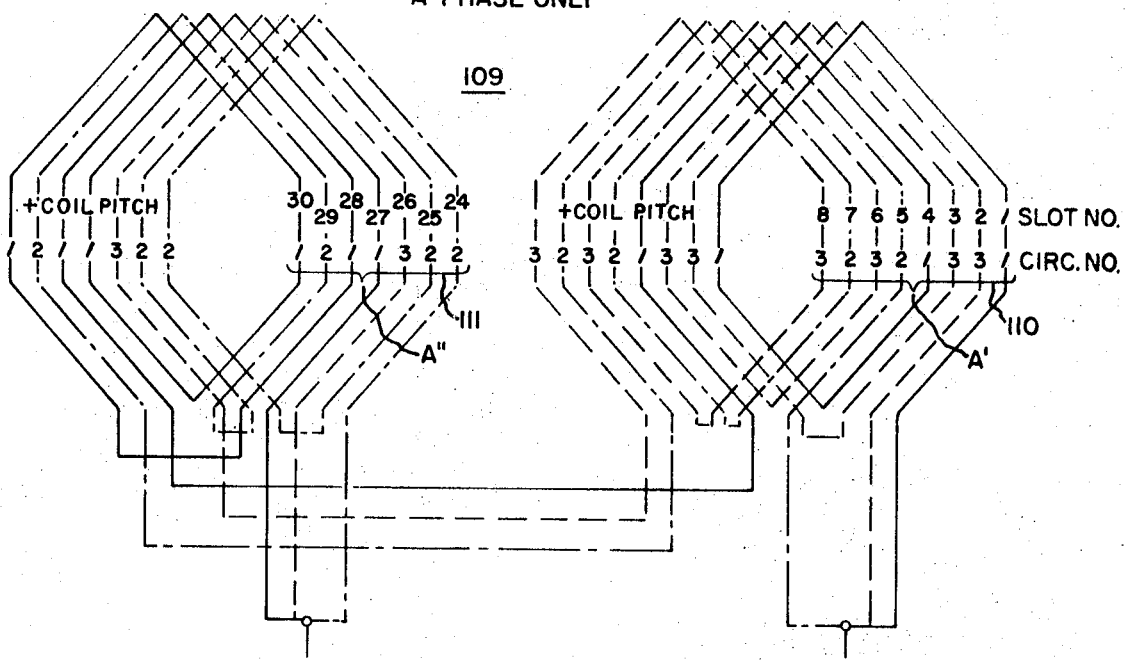
Figure 4:
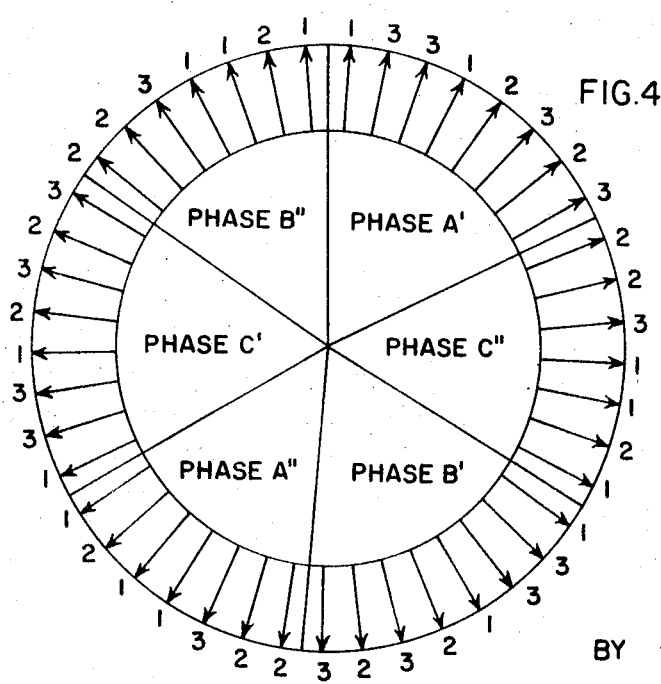

FIG. 3 and FIG. 4 illustrate a modified form of the invention utilizing the same principles of the invention as illustrated in FIGS. 1 and 2 to reduce unbalance between between circuits. FIG. 3 shows the A phase of a winding 109 for a two pole, 45 slot dynamoelectric machine winding having three parallel connected circuits per phase. As before, the winding has a positive phase belt A' with top coil sides designated by numeral 110 and a negative phase belt A'' with top coil sides designated by numeral 111. Phase belt A' contains eight or a greater number of coils, while phase belt A'' contains seven or a lesser number of coils. The sequence among circuits in winding pattern 109 moving from right to left is 1, 3, 3, 1, 2, 3, 2, 3 for the greater phase belt A' and 2, 2, 3, 1, 1, 2, 1 in the lesser phase belt A''.

FIG. 4 is a vector diagram showing all three phases of winding 109 with the coil sequences indicated for the positive and negative phase belts of phases A, B and C.

The following Table I gives a summary of the arrangements of coil side circuit sequences in phase A of windings 101 and 109 for purposes of comparison.

TABLE I

|  | Winding 101 | | | Winding 109 | | |
|---|---|---|---|---|---|---|
| Circuit Number | 1 | 2 | 3 | 1 | 2 | 3 |
| Slot numbers in A' phase belt for top bars | 1<br>7 | 5<br>6 | 2<br>3<br>4<br>8 | 1<br>4 | 5<br>7 | 2<br>3<br>6<br>8 |
| Slot numbers in A'' phase belt for top bars | 26<br>27<br>29 | 24<br>25<br>30 | 28 | 27<br>28<br>30 | 24<br>25<br>29 | 26 |
| Number of coils in A' | 2 | 2 | 4 | 2 | 2 | 4 |
| Number of coils in A'' | 3 | 3 | 1 | 3 | 3 | 1 |

The slot numbers of the top coil sides for the positive and negative phase belts are indicated, while the bottom two lines of Table I illustrate that the same approach is employed in both patterns to reduce unbalance. Namely, the phase belt A' having the greater number of coils contains, in both cases, two turns for each of the circuits 1 and 2, but four turns of circuit 3. Commensurately, the other phase belt with the lesser number of coils contains, in both winding patterns, three coils of each of the circuits 1 and 2, but only one coil from circuit 3. It will be understood in the foregoing table, that the designation of the circuits as 1, 2 and 3 is purely arbitrary, and that other designations could be given including reversal of the arbitrarily applied numerical designations.

In order to consider the performance of the two windings 101 and 109, it should be noted by way of background that the p.u. (per unit) voltage of any one of a number of parallel circuits in a phase comprises the ratio between the open-circuit voltage generated in the one circuit and the rated voltage of the phase, and is a measure of the magnitude of voltage unbalance between the one circuit and the phase. Similarly, the phase angle displacement between the open-circuit voltage generated in the one circuit and the rated voltage of the phase is a measurement of the phase angle of voltage unbalance between the one circuit and the phase. Furthermore, the "relative heating" in the armature winding is the I²R losses therein due to load current (and to circulating currents because of the unbalance in voltages and reactances among the multiple circuits) divided by the I²R losses due to equally divided load current alone.

Thus the performances of phase A of the respective windings 101 and 109 are set forth in Table II below.

TABLE II

|  | Winding 101 | | | Winding 109 | | |
|---|---|---|---|---|---|---|
| Circuit Number | 1 | 2 | 3 | 1 | 2 | 3 |
| Voltage magnitude (p.u.) | 0.997 | 0.9976 | 1.0027 | 1.0018 | 0.9995 | 0.9987 |
| Voltage phase angle (deg.) | +0.1082 | +0.0244 | −0.1321 | +0.0800 | +0.0605 | −0.1408 |

With reference to performance as measured by the above defined relative heating in the winding, it will be understood that relative heating is dependent upon the coil pitch as well as other design factors, such as, the rated flux per pole and per slot. For one particular design, the relative heating in the circuit having the greatest heating for the two respective windings 101 and 109 is set forth in Table III below. The pole pitch in a 45 slot machine having two poles is 45/2 or 22.5.

TABLE III

| Coil Pitch | Relative Heating | |
| --- | --- | --- |
| | Winding 101 | Winding 109 |
| 15/22.5 | 1.058 | 1.067 |
| 16/22.5 | 1.103 | 1.111 |
| 17/22.5 | 1.050 | 1.153 |
| 18/22.5 | 1.071 | 1.138 |
| 19/22.5 | 1.027 | 1.089 |
| 20/22.5 | 1.045 | 1.074 |
| 21/22.5 | 1.087 | 1.113 |

In view of the foregoing explanation, it will be seen that for winding 101, the relative heating is least when the coil pitch is 19/22.5. The voltage unbalance and relative heating values above do not lend themselves to ready comparison with other winding patterns, such as in the aforementioned Haberman and Harrington patents which have a greater number of slots and thus enable more opportunity for adjusting the coil sequences to produce unbalance. For a generator having a relatively small number of slots, 45 in the present case, it is exceedingly difficult to achieve values of the type enumerated above, since the fewer the number of armature slots, the less likely it is that the coils of a phase belt can be subdivided into more than one circuit per pole such that circuits can be paralleled without substantial circulating currents.

Thus there have been described improved winding arrangements for a dynamoelectric machine having several parallel connected circuits per phase and a relatively small number of slots. It is, of course, intended to cover in the appended claims all modifications as fall within the true spirit and scope of the invention.

What I claim as new and desire to secure by letters patent of the United States is:

1. A dynamoelectric machine comprising a three phase winding and a 45 slot core, each phase of said winding including three parallel connected circuits arranged in two series connected portions respectively disposed in a greater phase belt of eight coils and an oppositely poled lesser phase belt of seven coils, one of said circuits having four coils in the greater phase belt and one coil in the lesser phase belt all connected in series, the other two of said circuits each having two coils in the greater phase belt and three coils in the lesser phase belt all connected in series, the coil sequences of said circuits being arranged to minimize unbalance between circuits.

2. The combination according to claim 1, wherein the circuits in each phase are designated 1, 2 and 3, the circuit sequence in the greater phase belt being 1, 3, 3, 3, 2, 2, 1, 3 and the circuit sequence in the lesser phase belt being 2, 2, 1, 1, 3, 1, 2.

3. The combination according to claim 1, wherein said circuits are designated 1, 2 and 3 and where the circuit sequence in the greater phase belt is 1, 3, 3, 1, 2, 3, 2, 3 and the circuit sequence in the lesser phase belt is 2, 2, 3, 1, 1, 2, 1.

* * * * *